(12) United States Patent
Schwab et al.

(10) Patent No.: US 6,699,810 B2
(45) Date of Patent: Mar. 2, 2004

(54) METHOD OF PRODUCING HYBRID METAL/CERAMIC COMPOSITES

(75) Inventors: Stuart T. Schwab, Albuquerque, NM (US); Thomas W. Hardek, Jemez Springs, NM (US); Joel D. Katz, Los Alamos, NM (US)

(73) Assignee: Thor Technologies, Inc., Albuquerque, NM (US)

( * ) Notice: Subject to any disclaimer, the term of this patent is extended or adjusted under 35 U.S.C. 154(b) by 53 days.

(21) Appl. No.: 09/929,873

(22) Filed: Aug. 14, 2001

(65) Prior Publication Data

US 2003/0209838 A1 Nov. 13, 2003

(51) Int. Cl.$^7$ .................................................. H05B 6/64
(52) U.S. Cl. ........................................ 501/432; 264/624
(58) Field of Search ............................... 264/430, 432, 264/624

(56) References Cited

U.S. PATENT DOCUMENTS 5,459,114 A * 10/1995 Kaya et al. ................. 501/95.2
5,464,918 A * 11/1995 Schwark ....................... 528/24

* cited by examiner

Primary Examiner—Christopher A. Fiorilla
(74) Attorney, Agent, or Firm—John L. Sigalos

(57) ABSTRACT

A method of making a ceramic composite wherein a polymeric ceramic precursor or fiber reinforcement infiltrated with a polymeric ceramic precursor is associated with at least one metallic element to form a preceramic composite and the said composite is pyrolyzed by high frequency microwave radiation, preferably in the form of a beam, until the polymeric ceramic precursor is converted into a ceramic having the at least one metallic element integrally formed as part of said ceramic.

The products obtained by such method comprising ceramic metal composites formed by pyrolyzing a preceramic composite to high frequency microwave radiation until the polymeric ceramic precursor is converted into a ceramic having at least one metallic element integrally formed as a part of said component.

21 Claims, 1 Drawing Sheet

METHOD OF PRODUCING HYBRID METAL/CERAMIC COMPOSITES

BACKGROUND OF THE INVENTION

The present invention relates to the use of high frequency microwave (HFMW) radiation, preferably in the form of a beam, to make hybrid metal ceramic composites and to the resultant products. It relates particularly to the combination of preceramic polymer infiltration with high frequency microwave pyrolysis referred to as "PIMP" processing.

Ceramic composites, such as continuous fiber-reinforced ceramic composites (CFCCs), are inherently wear and erosion resistant, retain strength at higher temperatures and are lighter in weight than competing metals. Many applications, ranging from turbine engines and rocket nozzles to gun barrels require repeated or extended exposure to aggressive gaseous species at high temperature and pressure to form such products.

The composites formed have to be combined with other materials, such as metallic elements, and parts to form the final product, such as a turbine engine. Ceramics, including ceramic composites, are inherently brittle, while metals are inherently ductile. These inherent properties render the attachment of ceramics and ceramic composites to metal structures problematic.

Development of effective methods of processing of CFCCs has been a subject of intense investigation for over 15 years, and several approaches with potential for industrial utilization have been identified. While chemical vapor infiltration (CVI) technology is currently viewed as the industry leader, it is a slow, complex process with many inherent difficulties, including a corrosive gas environment, a high cost for process tooling and a substantial amount (15–25%) of residual porosity. Although some of these issues have been mitigated by new CVI methods, few metals can tolerate the highly corrosive CVI atmosphere, and those that can (e.g., tungsten alloys) have very high specific gravities, adding substantial weight to the structure.

This is particularly true of products in which the metal is in the form of tubes. Currently, three basic methods are used to produce actively cooled CFCC components: i) heavy, refractory metal tubes are co-processed with the CFCC; ii) metal tubes are brazed to the CFCC; or iii) a very dense matrix CFCC is processed with cooling passages into which a metal liner may or may not be inserted. All three approaches suffer from substantial shortcomings.

In addition to new methods of producing fiber-reinforced ceramics, simple, rapid and reliable methods of attaching the CFCC to the metal support structure are needed. Although fiber-reinforced ceramics are much less brittle than their monolithic counterparts, they are not ductile like metal components. In addition, dense ceramics and ceramic composites are difficult to machine. For these and other reasons, conventional attachment strategies are inadequate. The attachment issue could be simplified greatly if metallic features, such as attachment lugs, could be co-processed as an integral part of the ceramic component.

Polymer infiltration/pyrolysis (PIP) processing is a new method of manufacturing CFCCs that is a simple extension of the traditional methods used to manufacture carbon-carbon and polymer-matrix composites. PIP processing is inherently compatible with the intelligent manufacturing techniques currently under development for polymer matrix composites, and has been shown to yield CFCCs with properties equal or superior to those produced by other methods. It is currently practiced by a number of firms using conventional pyrolysis methods. However, because of the change in density associated with the conversion of the matrix precursor to the finished ceramic, repeated infiltration/firing cycles are required to produce a dense finished ceramic product. Economic models developed as part of the DARPA Low Cost Ceramic Composites ($LC^3$) Program indicate that more than 30% of the cost of a specific CFCC part is derived from the time consumed during pyrolysis.

Further, it has not been possible to utilize these prior procedures to include metallic elements as an integrally formed part of the finished ceramic product. This is due to the fact that the CVI and conventional PIP processes require such high temperatures to convert the preceramic to the finished ceramic product that metallic elements processed therewith are adversely affected.

Also in the case of CVI processing, the pyrolysis atmosphere contains corrosive gases, such as HF and HCl, which corrode all but the most corrosion resistant metal elements.

SUMMARY OF THE INVENTION

The present invention overcomes the problems of the prior. art and provides for the co-processing of metallic elements and fiber performs infiltrated with a ceramic precursor to form hybrid metal/ceramic composite products without degradation of the metallic element, regardless of its composition.

Briefly stated, the present invention comprises the method of making a ceramic composite containing at least one metal element comprising associating a polymeric ceramic precursor with at least one metallic element therewith to form a preceramic composite, and subjecting said composite to high frequency microwave radiation, preferably in the form of a beam, until the polymeric preceramic precursor is converted into a ceramic. Preferably, the polymeric ceramic precursor is infiltrated in a fiber reinforcement.

The invention also comprises the resultant products are ceramic composites having metallic elements integrally formed therewith as hereinafter described.

In this process, the fiber acts as a susceptor, and becomes hot when exposed to HFMW radiation. The hot susceptor in turn induces the conversion of the preceramic polymer to ceramic. Other material additives, such as powders, flake, whiskers, and chopped fibers, can be employed as susceptors if they are found to posses the required dielectric properties (e.g., dielectric constant, loss tangent, etc. as known to those skilled in this art). Silicon carbide and certain forms of carbon have been found to function adequately as susceptors; however, any material with the appropriate dielectric chemical and physical properties as, again, known to those skilled in this art can be used, may be employed.

DETAILED DESCRIPTION

Figure 1:
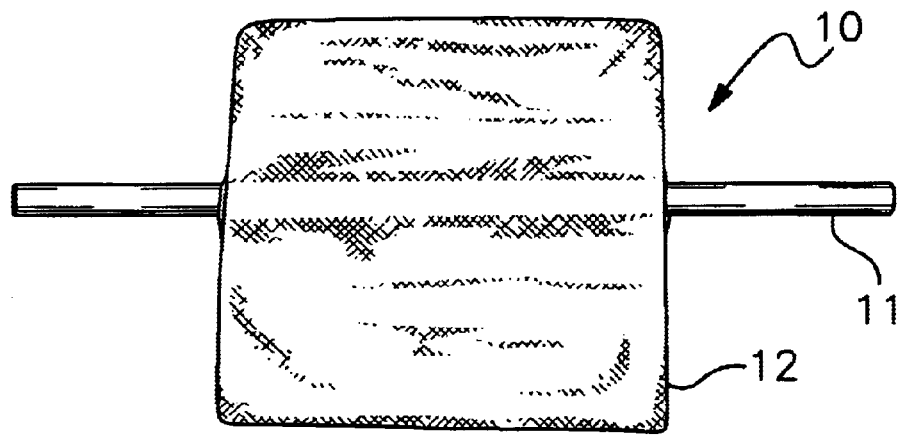
FIG. 1 is a copy of a picture of the composite made as set forth in Example 1 hereof.

While the instant invention can be carried out with any known fluid preceramic polymer loaded with any known susceptor associated with a formed metallic element in a microwave-permeable mold, such as one made of glass, it is preferred to utilize a shaped fiber reinforcement infiltrated with a polymeric ceramic precursor and the invention will be further described in connection therewith.

Suitable in this invention are continuous SiC fiber, chopped SiC fiber, milled SiC fiber, SiC whiskers, SiC particulate, SiC flake, and other forms of SiC found to be effective susceptors or materials to form fiber reinforcements through analysis or experiment.

Also suitable are continuous carbon or "graphite" fiber, chopped carbon or "graphite" fiber, milled carbon or "graphite" fiber, carbon or "graphite" whiskers, carbon or "graphite" particulate, carbon or "graphite" flake, and other forms of carbon and graphite found to be effective susceptors or materials to form fiber reinforcements through analysis or experiment.

Further, while the instant invention is applicable to any metal or metal alloy that can conduct electricity in a metallic fashion, such as copper, iron, aluminum, Inconel alloys (such as 625) and TZM Molybdenum, it will be particularly described in connection with copper, aluminum, and stainless steel.

Also, the terms "formed metallic element" or "elements" and "metallic element" or "elements" mean metals or alloys thereof which are in shapes such as pipes, plates, bars, attachment lugs, and the like.

The CFCCs are any conventionally used and known in this art. Examples include silicon carbide fiber reinforced silicon carbide matrix (SiC/SiC) composites, silicon carbide fiber reinforced silicon nitride (SiC/$Si_3N_4$) matrix composites, carbon fiber reinforced silicon carbide matrix (C/SiC) composites, and similar materials. The silicon carbide fibers used as reinforcement may be taken from the Sylramic™, Nicalon™, or Tyranno™ family of silicon carbide fibers, or similar silicon carbide products. The carbon fibers used as reinforcement may be taken from the Thornel™ family of carbon fibers, or similar carbon or graphite products. The silicon carbide matrix can be derived from allylhydridopolycarbosilane, methylpolycarbosilane, or other polymeric precursors to silicon carbide used alone or in a blend or combination. If other matrix materials are desired, inorganic, organometallic, or hybrid polymers, including sol-gel ceramic precursors, that have been shown by experiment (e.g., pyrolysis with a conventional furnace) to yield the desired matrix on pyrolysis may be employed. In the description that follows, the invention will be further described in combination with silicon carbide fiber reinforced silicon carbide matrix composites; however, this description is provided as illustration only and is not intended to limit the potential application of the invention.

In addition, the apparatus used to generate the HFMW energy in the form of a beam is the GYROTRON. This known apparatus can produce HFMW radiation ($\geq 20$ GHz) in the form of a beam similar to a laser, but with a larger irradiation area. The GYROTRON is a highly specialized, but commercially available, device that contains lenses and mirrors that can transmit the energy as a quasi-optical beam to focus the energy and steer it. For small to medium-sized parts, the focusing and steering can steer the energy to cover the part completely, or the energy can be delivered in such a manner as to completely fill a cavity or chamber of suitable design. For larger parts, mirrors can be used to sweep or raster the energy over the part. Moreover, the energy can be pulsed or gated to control the rate at which the part is heated to form the final hybrid ceramic composite. The optimum energy level utilized, heating rate, and other parameters for any particular given combination of metal and ceramic precursor and fiber reinforcement can be determined by routine experimentation utilizing the GYROTRON.

In carrying out the process of the present invention the preceramic composite is formed in the conventional manner, such as use of the conventional and known PIP methodology, to combine the metal element with the preceramic composite.

Namely, a preceramic polymer is used to saturate a reinforcing fiber preform, which preform is in the shape desired for the final desired ceramic composite. The metallic element can be integrated into the fiber perform before or after the preform is saturated with matrix precursor resin using conventional polymer composite or plastic fabrication methods, such as vacuum baglautoclave, resin transfer molding, press molding, and the like.

However, instead of using the conventional ovens used in PIP methodology, the GYROTRON is used for pyrolysis that converts the cured fiber-reinforced preceramic to the hybrid ceramic composite. To obviate any damage to the metallic element(s) that may arise while being irradiated in the GYROTRON, the metallic element(s) can be grounded. Because properly grounded metals reflect GYROTRON energy, the metallic elements are heated only indirectly by the hot ceramic and do not reach the higher temperature of the ceramic.

Since the preceramic polymers used in the instant process do not contain corrosive elements, the pyrolysis atmosphere in the GYROTRON processing chamber is free of corrosive gases, such as the previously noted HF and HCl, that are present in CVI processing. Unlike the chemical precursors used in the CVI process, which are generally volatile halide compounds, such as $SiCl_4$ or $SiF_4$, that produce corrosive gases, such as hydrochloric or hydrofluoric acid, on pyrolysis, preceramic polymers are free of halogens, and their pyrolysis products are generally not corrosive, or substantially less so. In addition, the slow pace of the CVI process requires that the metals remain in the corrosive environment at high temperature for extended periods of time. In the instant invention, high temperatures are sustained only for short periods, and the short time at high temperature is spent in a very substantially less corrosive environment.

As in other procedures, repeated exposure of the composite to the HFMW energy beam in the GYROTRON, coupled with repeated infiltrations with the selected preceramic polymer, can be carried out to densify the composite to the degree desired.

As previously noted, the metallic element(s) need not be grounded prior to exposing the composite to the GYROTRON radiation, but it can be grounded if for any particular composite it is found that the metallic element is being unduly heated or otherwise adversely affected during processing.

The invention will be further described in connection with the examples that follow which are set forth for purposes of further illustration only.

EXAMPLE 1

A SiC/SiC composite with a copper tube insert was prepared by placing a short length of 0.25 inch refrigeration grade copper tubing in the middle of a series of resin-saturated, pre-cut CG-Nicalon silicon carbide cloth (plain weave) plies. The assembly was enclosed in a vacuum bag and cured using a process oven under conditions employed in conventional polymer composite processing. The cured assembly was placed in the GYROTRON processing chamber and pyrolyzed at 37 GHz for approximately five minutes using the GYROTRON pyrolysis method described previously. The fiber reinforced ceramic portions of the assembly were observed to glow, but the tube appeared unaffected. It was necessary to flip the assembly over and repeat irradiation of the lower side of the composite because the area underneath the tube appeared to have been shielded from the energy directed toward the sample from above.

Following pyrolysis, the visible portion of the tube appeared unchanged, and the sample was otherwise unremarkable. Densification continued using the PIMP method for an additional four cycles. The specimen is shown at that stage in FIG. 1, in which 10 is the specimen, 11 the copper tubing, and 12 the reinforced ceramic.

EXAMPLE 2

Using the same procedure as in Example 1, a SiC/SiC composite with a stainless steel attachment lug was prepared by placing a small piece of stainless steel sheet metal in the middle of a series of resin-saturated, pre-cut CG-Nicalon silicon carbide cloth (plain weave) plies. The assembly was enclosed in a vacuum bag and cured using conventional methods. The cured assembly was placed in the GYROTRON processing chamber and pyrolyzed using the GYROTRON pyrolysis method described previously. The fiber reinforced ceramic portions of the assembly were observed to glow, but the insert appeared unaffected. It was necessary to flip the assembly over and repeat irradiation of the lower side of the composite because the area underneath the stainless steel appeared to have been shielded from the energy directed toward the sample from above. Following pyrolysis, the visible portion of the steel insert appeared unchanged, and the sample was otherwise unremarkable.

The sample went through an additional four polymer infiltration/microwave pyrolysis cycles. Following the fourth process cycle, the steel insert was removed from the composite. With the exception of some polymer-derived ceramic adhering to the enclosed surface, the stainless steel insert appeared to have been unaffected by the process.

Figure 2:
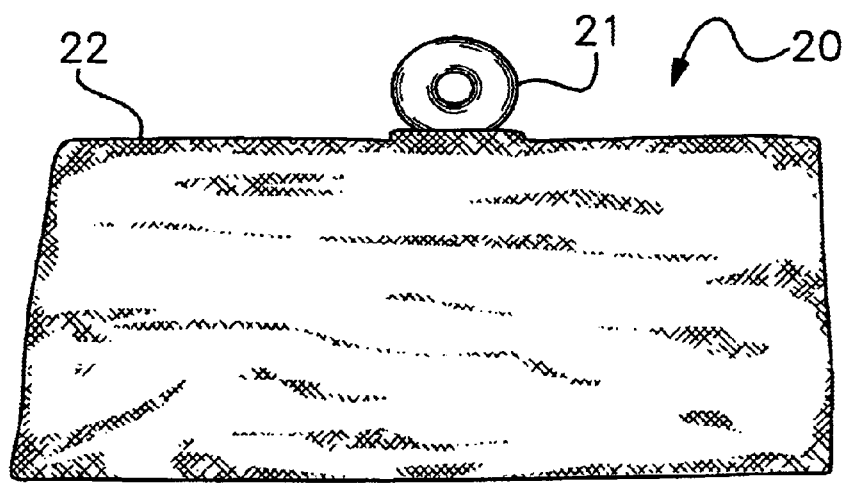
FIG. 2 is a copy of the picture of the composite made as set forth in Example 2 hereof.

This hybrid ceramic product 20 is shown in FIG. 2, with attachment lug 21 embedded in reinforced ceramic 22.

EXAMPLE 3

Using the procedure of Example 1, a SiC/SiC composite with an aluminum insert was prepared by placing a small aluminum bar in the middle of a series of resin-saturated, pre-cut CG-Nicalon silicon carbide cloth (plain weave) plies. The assembly was enclosed in a vacuum bag and cured using conventional methods. The cured assembly was placed in the GYROTRON processing chamber and pyrolyzed using the GYROTRON pyrolysis method described previously. The fiber reinforced ceramic portions of the assembly were observed to glow, but the insert appeared unaffected. It was necessary to flip the assembly over and repeat irradiation of the lower side of the composite because the area underneath the aluminum insert appeared to have been shielded from the energy directed toward the sample from above. Following pyrolysis, the visible portion of the aluminum insert appeared unchanged, and the sample was otherwise unremarkable.

The sample went through an additional three PIMP process cycles, after which the aluminum insert was removed from the composite. With the exception of some polymer-derived ceramic adhering to the enclosed surface, the aluminum insert appeared to have been unaffected by the process.

While the precise reasons are not completely understood, it is believed that the microwave energy utilize in the GYROIRON can pyrolyze the preceramic portion of the composite to a ceramic without adversely affecting the metal portion thereof and that this may be aided by the fact the fact that the processing chamber of the GYROTIRON is lined with absorbent material (cement) which absorbs the excess and/or reflected microwave energy and mitigates any undue heating of the metal portion.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A method of making a ceramic metal composite comprising associating a polymeric ceramic precursor with at least one metallic element to form a preceramic composite, and subjecting said composite to pyrolysis by high frequency microwave radiation, until the polymeric ceramic precursor is converted into a ceramic having said at least one metallic element integrally formed as part of said composite.

2. The method of claim 1 wherein the microwave radiation is in the form of a beam.

3. The method of claim 2 wherein the preceramic ceramic precursor is a fluid placed in a microwave-permeable mold loaded with a susceptor.

4. The method of claim 3 wherein the microwave radiation is at least about 20 GHz.

5. The method of claim 1 wherein the metallic element is grounded prior to exposure to high frequency microwave radiation.

6. The method of claim 1 wherein the susceptor is a continuous SiC fiber, chopped SiC fiber, milled SiC fiber, SiC whisker, SiC particulate, SiC flake, continuous carbon or graphite fiber, chopped carbon or graphite fiber, milled carbon or graphite fiber, carbon or graphite whisker, carbon or graphite particulate, carbon or graphite flake, or other forms of SiC, carbon, and graphite found to be effective susceptors.

7. The method of claim 6 wherein the susceptor is a SiC.

8. The method of claim 1 wherein the metallic element is made of any metal and/or metal alloy that can conduct electricity in a metallic fashion.

9. A method of making a ceramic metal composite comprising placing a fluid polymeric ceramic precursor loaded with a susceptor in a mold, associating therewith at least one metallic element made of any metal and/or metal alloy that can conduct electricity in a metallic fashion to form a preceramic composite, and subjecting said composite to pyrolysis by microwave radiation of at least about 20 GHz for a time sufficient to convert said polymeric ceramic precursor to a ceramic having said at least one metallic element integrally formed as part of said ceramic composite.

10. The method of claim 9 wherein the microwave radiation is in the form of a beam.

11. The method of claim 10 wherein said susceptor is a continuous SiC fiber, chopped SiC fiber, milled SiC fiber, SiC whisker, SiC particulate, SiC flake, continuous carbon or graphite fiber, chopped carbon or graphite fiber, milled carbon or graphite fiber, carbon or graphite whisker, carbon or graphite particulate, carbon or graphite flake, or other forms of SiC, carbon, and graphite found to be effective susceptors.

12. The method of claim 11 wherein the susceptor is a SiC.

13. The method of claim 9 wherein the ceramic is densified by adding additional polymeric ceramic polymer thereto and again pyrolyzing the composite by said energy.

14. A method of making a ceramic metal composite comprising
forming a fiber reinforcement infiltrated with a polymeric ceramic precursor,
associating at least one metallic element therewith to form a preceramic composite, and
subjecting said composite to pyrolysis by high frequency microwave radiation, until the polymeric ceramic precursor in said composite is converted into a ceramic having said at least one metallic element integrally formed therewith.

15. The method of claim 14 wherein the microwave radiation is in the form of a beam.

16. The method of claim 15 wherein the microwave radiation is at least about 20 GHz.

17. The method of claim 15 wherein the metallic element is made of any metal and/or metal alloy that can conduct electricity in a metallic fashion.

18. The method of claim 14 wherein the fiber reinforcement is a continuous SiC fiber, chopped SiC fiber, milled SiC fiber, SiC whisker, SiC particulate, SiC flake, continuous carbon or graphite fiber, chopped carbon or graphite fiber, milled carbon or graphite fiber, carbon or graphite whisker, carbon or graphite particulate, carbon or graphite flake, or other forms of SiC, carbon, and graphite found to be effective susceptors.

19. The method of claim 14 wherein said ceramic is densified by at least one additional infiltration thereof with a polymeric preceramic precursor and pyrolysis thereof by said energy.

20. A method of making a ceramic metal composite comprising
forming a fiber reinforcement infiltrated with a polymeric ceramic precursor,
associating therewith at least one metallic element made of any metal and/or metal alloy that can conduct electricity in a metallic fashion to form a preceramic composite, and
pyrolyzing the polymeric ceramic precursor in said composite by a beam of microwave radiation of at least about 20 GHz for a time sufficient to convert said polymeric ceramic precursor to a ceramic having said at least one metallic element integrally formed as part of said ceramic composite.

21. The method of claim 20 wherein the fiber reinforcement is a continuous SiC fiber, chopped SiC fiber, milled SiC fiber, SiC whisker, SiC particulate, SiC flake, continuous carbon or graphite fiber, chopped carbon or graphite fiber, milled carbon or graphite fiber, carbon or graphite whisker, carbon or graphite particulate, carbon or graphite flake, or other forms of SiC, carbon, and graphite found to be effective susceptors.

* * * * *

UNITED STATES PATENT AND TRADEMARK OFFICE
CERTIFICATE OF CORRECTION

| | | |
|---|---|---|
| PATENT NO. | : 6,699,810 B2 | Page 1 of 1 |
| APPLICATION NO. | : 09/929873 | |
| DATED | : March 2, 2004 | |
| INVENTOR(S) | : Stuart T. Schwab et al. | |

It is certified that error appears in the above-identified patent and that said Letters Patent is hereby corrected as shown below:

Column 1, line 4, insert the following paragraph:

--STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Grant No. DMI-9960985 awarded by the National Science Foundation.--

Signed and Sealed this
Fifteenth Day of March, 2011

David J. Kappos
*Director of the United States Patent and Trademark Office*